C. L. Barnes,
Wood Auger.
N° 21,179.　　　　　Patented Aug. 17, 1858.
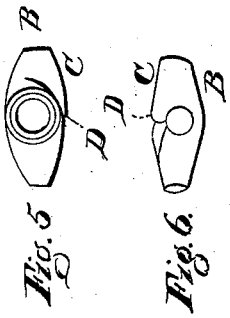
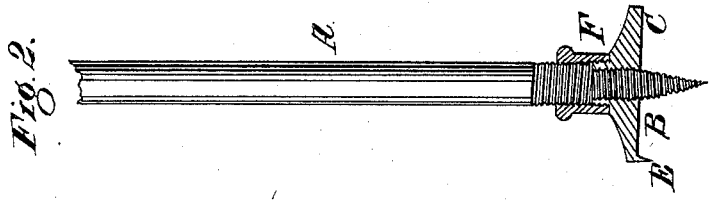
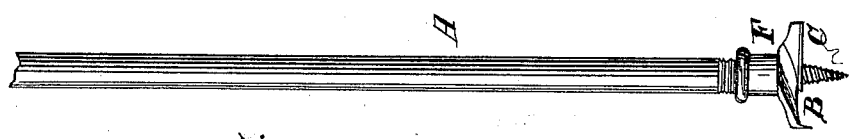

UNITED STATES PATENT OFFICE.

CHARLES L. BARNES, OF NEW YORK, N. Y.

METHOD OF SECURING THE CUTTERS TO THE SPINDLES OF AUGERS.

Specification of Letters Patent No. 21,179, dated August 17, 1858.

*To all whom it may concern:*

Be it known that I, CHARLES L. BARNES, of the city, county, and State of New York, have invented certain new and useful Improvements in Auger and Center Bits; and I do hereby declare that the following is a full and exact description of the same, reference being had to the accompanying drawings and to the letters of reference marked thereon.

The nature of my invention consists in the manner of securing the cutter to the spindle of the bit, so that it cannot be detached and left in the bored hole when the motion of the bit is reversed to take it out of the hole to clean out the chips and cuttings, and so that it can be readily attached to, and detached from the spindle when required, and in the peculiar conformation of the cutting edge or edges of the cutter by which its efficiency is greatly increased.

Figure 1 in the accompanying drawings is a perspective view of the spindle of a bit with the cutter secured to it in place, Fig. 2 a similar view with the cutter and check nut shown in section, Fig. 3 is a sectional view of the check nut detached, and Fig. 4 an edge, Fig. 5 a top, and Fig. 6 a bottom plan view of the cutter detached.

A is the spindle of the bit, made either of steel, or of iron with a steel point, of a size proportioned to the cutters to be used upon it, and to the description of work to which the bit is to be applied. The upper end of it is squared off into a pyramidal form so as to be fitted into a handle or to the mouth of an ordinary brace. The lower end of it is turned down, for a distance of about ¾ of an inch from its point, sufficiently to form a shoulder at the upper part against which the top of the hub of the cutter shall rest, when the cutter is put upon the spindle and screwed up to place, and upon the part so turned down is cut a right handed screw thread, which tapers off from below the under side of the cutter to a sharp point for the purpose of forming an entering and feeding screw for the bit when in use. A left handed screw thread is cut upon the spindle for a distance of about ½ of an inch above the shoulder for the purpose hereinafter mentioned.

B is the cutter, made of steel, and having a hub on its upper side in which is cut a female screw which fits upon the lower portion of the spindle, and which screws up against the shoulder before named. Upon the outer side of the hub is cut a screw thread which corresponds with, and forms a continuation of the left handed screw thread upon the spindle, when the hub is screwed up to place. The cutter has a cutting edge C, which is formed by chamfering or beveling off the side of one of its wings, and which is continued from the point of the wing to a point at or beyond the line of the center of the length of the cutter, where it is formed into a cutting lip D, which serves the purpose of cutting the wood and starting the chip ahead of the main part of the cutting edge, and of lessening the labor of boring, while it makes a cleaner and more perfect cut.

E is a cutting point standing at a right angle to the lower edge of the cutter, which cuts the grain of the wood vertically at the periphery of the hole being bored by the bit and which governs the size of the hole so bored.

F is a check nut, having a female screw cut in it to fit the left handed thread cut upon the spindle and upon the outside of the hub on the cutter, which is screwed down upon the cutter to "jam" it so as to secure it from being unscrewed when the motion of the bit is reversed to remove it from the bored hole to clean the hole from chips and cuttings.

A variety of cutters of different diameters formed upon the same plan as the one described—can be fitted to, and used upon the spindle, so that holes of as many sizes as there are sizes of cutters may be bored by taking off one cutter and attaching others of the different sizes in its place.

To remove one cutter from the spindle and attach another in its place, the check nut is first screwed back a sufficient distance upon the spindle to be cleared from the hub of the cutter; the cutter is then unscrewed, and another is put in its place, when the check nut is again screwed down upon it as before to hold it securely in place.

I do not claim a bit having detachable cutters, nor a bit by which different sized holes may be bored by changing the size of its cutters, but What I do claim as my invention and desire to secure by Letters Patent is—

The combination of the spindle A, cutter B, and check nut F, for the purpose of securing the cutter to the spindle arranged in the manner and for the purpose as herein set forth.

CHAS. L. BARNES.

Witnesses:
FRANCIS S. LOW,
SIDNEY LOW.